United States Patent [19]
Suh et al.

[11] Patent Number: 6,028,159
[45] Date of Patent: Feb. 22, 2000

[54] POLYAMIDEIMIDE FOR OPTICAL COMMUNICATIONS AND METHOD FOR PREPARING THE SAME

[75] Inventors: Dong-hack Suh, Daejeon; Eun-young Chung, Chungcheongnam-do; Tae-hyung Rhee, Sungnam, all of Rep. of Korea

[73] Assignees: SamSung Electronics Co., Ltd., Suwon; Korea Research Institute of Chemical Technology, Daejeon, both of Rep. of Korea

[21] Appl. No.: 09/223,728

[22] Filed: Dec. 31, 1998

[30] Foreign Application Priority Data

Dec. 31, 1997 [KR] Rep. of Korea ............. 97/82004

[51] Int. Cl.$^7$ ................................. C08G 73/14
[52] U.S. Cl. ................ 528/170; 528/171; 528/172; 528/173; 528/174; 528/176; 528/183; 528/188; 528/220; 528/229; 528/310; 528/322; 528/350
[58] Field of Search .............. 548/462; 528/170, 528/174, 172, 173, 183, 322, 229, 350, 220, 310, 188, 171

[56] References Cited

U.S. PATENT DOCUMENTS

| | | | |
|---|---|---|---|
| 4,377,652 | 3/1983 | Ohmura et al. | 524/104 |
| 5,187,254 | 2/1993 | Yokelson et al. | 528/350 |
| 5,521,276 | 5/1996 | Choi et al. | 528/322 |
| 5,532,334 | 7/1996 | Choi et al. | 528/350 |
| 5,587,452 | 12/1996 | Koning et al. | 528/353 |
| 5,686,559 | 11/1997 | Rhee et al. | 528/353 |

FOREIGN PATENT DOCUMENTS

| | | |
|---|---|---|
| 0 530 706 A1 | 3/1993 | European Pat. Off. . |
| 2 016 487A | 9/1979 | United Kingdom . |

*Primary Examiner*—P. Hampton-Hightower
*Attorney, Agent, or Firm*—Robert E. Bushnell, Esq.

[57] ABSTRACT

A polyamideimide for optical communications, having a minimum light absorption loss in a near infrared light wavelength range, high thermal stability and excellent film processibility, and a method for preparing the same are provided. The polyamideimide has a higher refractive index than the conventional fluorinated polyamideimide. Thus, when using such polyamideimide as a material for a core of an optical fiber, the selection range on the material for cladding becomes wide. Also the coating property and adhesiveness to a substrate are improved, thereby providing a good film processibility and heat resistance.

14 Claims, No Drawings

POLYAMIDEIMIDE FOR OPTICAL COMMUNICATIONS AND METHOD FOR PREPARING THE SAME

CLAIM OF PRIORITY

This application makes reference to, incorporates the same herein, and claims all lights accruing thereto under 35 U.S.C. §119 through my patent application entitled POLYAMIDEIMIDE FOR OPTICAL COMMUNICATION AND MANUFACTURING METHOD THEREOF earlier filed in the Korean Industrial Property Office on the $31^{th}$ day of December 1997 and there duly assigned Ser. No. 97-82004.

BACKGROUND OF THE INVENTION

1. Field of the Invention

The present invention relates to a polyamideimide for optical communications and a method for preparing the same, and more particularly, to a polyamideimide for optical communications, having a minimum optical loss in a near infrared wavelength range, high thermal stability and good film processibility, and a method for preparing the same.

2. Description of the Related Art

A wavelength range of light for optical communications has been shifted from 800 nm to 1550 nm, which corresponds to the near infrared wavelength range. Thus, it is ideal to manufacture an optical communication device using a material which barely absorbs light belonging to the wavelengths of the near infrared wavelength range.

A polymer is generally used for an optical substrate such as an optical lens or compact disk. Recently, many attempts have been made to use such polymers as optical waveguide materials for light transfer in the near infrared wavelength range.

A conventional polymer generally absorbs light of 1000–1700 nm which corresponds to the near infrared wavelength range. Such absorption of light in the near infrared wavelength range by the polymer is caused by overtones of harmonics due to stretching and deformation vibrations of carbon-hydrogen (C—H) bonds in alkyl, phenyl and other similar functional groups. Thus, it is not desirable to use the conventional polymer as the optical waveguide material utilizing the light of the near infrared wavelength range because of a large optical loss. In order to reduce the optical loss, the light absorption wavelength region of a polymer must be shifted from the near infrared wavelength range to a longer or shorter wavelength region. To this end, a method in which hydrogen in the C—H bond is substituted by fluorine (F) or deuterium (D) has been suggested.

Particularly, in the case of substituting hydrogen with deuterium, the C—D bond causes light absorption at the wavelength range of 1500 nm. Thus deuterium-substituted polymers are not suitable for materials for optical communications devices using 1500nm wavelengths. On the other hand, substitution of hydrogen by fluorine can minimize optical absorption loss at the wavelength in the range of 1000–1700 nm.

An optical material used for fabricating optical devices such as an opto-electronic integrated circuit (OEIC), an opto-electrical mixed wiring board (OEMWB), a hybrid integration device, a plastic optical fiber or a multi-chip module (MCM) must have good thermal stability during a fabrication process, particularly at a temperature of about 250° C. Since the thermal stability of an optical material is a very important factor, careful consideration must be taken into glass transition temperature, thermal decomposition temperature, thermal expansion coefficient or birefringence of the optical material.

Polyimides have been most widely known as a polymer having good thermal stability. Since polyimides are stable at a high temperature of about 400° C., great efforts to utilize polyimide as a material for optical communications have been consistently made.

However, generally, since a conventional polyimide has many C—H bonds in its molecule structure, it exhibits a large optical loss in the near infrared region. To overcome such a problem, recently, a method in which hydrogen in C—H bonds of a polyimide is partially or entirely substituted by fluorine has been proposed.

However, if hydrogen is substituted by fluorine, the refractive index of the polymer is decreased. Here, the content of fluorine in the polymer is proportional to the decreased level of the refractive index. Thus, since a polyimide obtained by substituting hydrogen in the C—H bonds by fluorine, that is, a fluorinated polyimide, has a low refractive index, in the case of using the same as a core, the range of selection of a material capable of being used for cladding becomes narrow.

Also, the higher the content of fluorine in the polyimide is, the lower the surface tension of a composition containing the polyimide is. Thus, it is difficult to coat such a composition on a substrate and the adhesion of a film comprised of the composition is poor. As a result, film characteristics are deteriorated and the film formed thereby is easily fragile. Thus, it is very difficult to put the polyimide into practical use for an optical communications material.

SUMMARY OF THE INVENTION

It is therefore an object of the present invention to provide an improved optical polymer for use in optical communications.

It is a further object of the present invention to provide a polymer for optical communications which minimizes optical loss in the near infrared wavelength of 1,000 to 1,700 nm.

It is a yet further object to provide a polymer for optical communications which has good thermal stability at 200° C. or more.

It is a still further object to provide a polymer for optical communications which has good film processing properties.

To achieve the above objects, the present invention to provides polyamideimides for optical communications, which have a minimum optical loss in a near infrared wavelength range of 1000–1700 nm, high thermal stability at a temperature of 200° C. or higher and good film processibility.

The present invention also provides a method for preparing polyamideimides for optical communications which have a minimum optical loss in a near infrared light wavelength range of 1000–1700 nm, high thermal stability at a temperature of 200° C. or higher and excellent film processibility.

Specifically, there are provided polyamideimides for optical communications, having as a repeating unit a monomer represented by the formula (1):

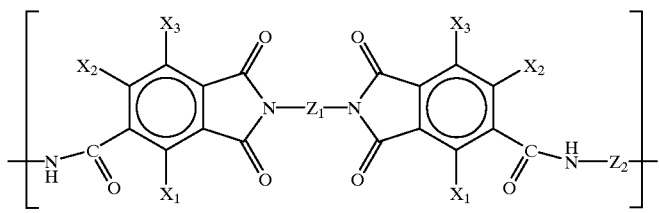
(1)

wherein $X_1$, $X_2$ and $X_3$ are independently selected from the group consisting of halogen atom, halogenated alkyl group, halogenated alkoxy group, halogenated aromatic ring group, $-NO_2$, $-OR^1$ and $SR^1$ (where $R^1$ is a halogenated alkyl or halogenated aromatic ring groups), and $Z_1$ and $Z_2$ are selected from the group consisting of divalent halogenated aliphatic hydrocarbon, divalent halogenated aliphatic cyclic hydrocarbon or divalent halogenated aromatic hydrocarbon.

Preferably, $X_1$, $X_2$ and $X_3$ are the same and selected from the group consisting of chloride atom, partially chlorinated or perchlorinated alkyl group, partially chlorinated or perchlorinated aromatic ring group, partially chlorinated or perchlorinated alkoxy group, and partially chlorinated or perchlorinated phenoxy group.

Also, $Z_1$ and $Z_2$ are selected from the group consisting of divalent halogenated aliphatic hydrocarbon of $C_1$–$C_{25}$, divalent halogenated aliphatic cyclic hydrocarbon of $C_1$–$C_{25}$, and divalent halogenated aromatic hydrocarbon of $C_1$–$C^{25}$. Here, divalent is taken to mean that the group can form two bonds. And, more preferably, $Z_1$ and $Z_2$ are selected from the group represented by the following formula:

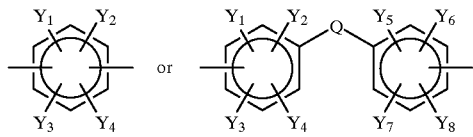

wherein $Y_1$, $Y_2$, $Y_3$ and $Y_4$ are independently selected from the group consisting of halogen atom, halogenated alkyl group, halogenated alkoxy group, halogenated aromatic ring group, $-NO_2$, $-OR^1$ and $SR^1$ (where $R^1$ is a halogenated alkyl or halogenated aromatic ring groups); and Q is a simple chemical bond or selected from the group consisting of $-O-$, $-CO-$, $-SO_2-$, $-S-$, $-(OT)_m-$, $(OT)_m-$ and $-(OTO)_m-$ (where T is halogenated alkylene or halogenated arylene groups and m is an integer from 1 to 10). Here, the formula indicates that the substitution positions on the phenyl groups are unspecified.

There is also provided a method for preparing a polyamideimide for optical communications, having a monomer expressed by the chemical formula (1) as a repeating unit, comprising the steps of:

(a) reacting bis(3,5,6-trisubstituted-4-halogenformyl-1,2-phthalic imide) derivative (A) with diamine compound (B) at −20~50° C., and then precipitating the reaction mixture using distilled water or an organic solvent, to obtain polyamideamic acid; and (b) imidizing the polyamideamic acid:

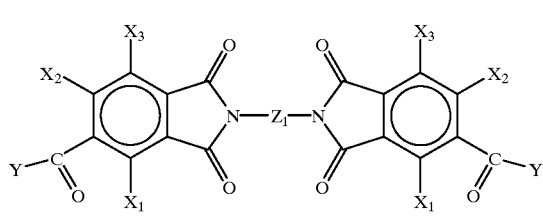
(A)

(B)

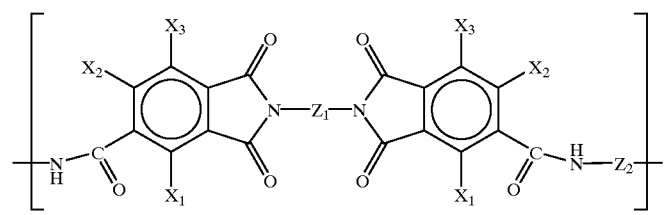
(1)

wherein $X_1$, $X_2$ and $X_3$ and are independently selected from the group consisting of halogen atom, halogenated alkyl group, halogenated alkoxy group, halogenated aromatic ring group, $-NO_2$, $-OR^1$ and $SR^1$ (where $R^1$ is a halogenated alkyl or halogenated aromatic ring groups), and $Z_1$ and $Z_2$ are selected from the group consisting of divalent halogenated aliphatic hydrocarbon, divalent halogenated aliphatic cyclic hydrocarbon or divalent halogenated aromatic hydrocarbon; and Y is a halogen atom. Preferably, in the step (a), the bis(3,5,6-trisubstituted-4-halogenformyl-1,2-phthalic imide) derivative (A) is reacted with the diamine compound (B) at 5~20° C. for 100~230 hours.

Imidization of the polyamideamic acid into the polyamideimide in the step (b) can be performed by a chemical method or a thermal method. In the chemical method, preferably, the polyamideamic acid is mixed with acetic anhydride and pyridine and then heated at 60 ~150° C., or toluene is added to the polyamideamic acid and then heated to a boiling point of the toluene. In the thermal method, preferably, the polyamideamic acid is heated by steps within a temperature range of 50~400° C.

DESCRIPTION OF THE PREFERRED EMBODIMENTS

A polyamideimide of the present invention has a higher refractive index than a conventional fluorinated polyimide. If the polyamideimide is used for a core, there are various options for materials for a cladding. Also, problems arising in the conventional fluorinated polyimide, that is, low adhesiveness and poor coating property for a substrate due to a low surface tension, can be solved.

In a polyamideimide according to the present invention, light absorption is minimized in the near infrared wavelength range, specifically in the range of 1000–1700 nm which corresponds to an optical communication wavelength range, due to overtone of $-OH$ and $-CH$. The polyamideimide having C—Cl bond is very useful in a polymer for optical waveguiding in the field of optical communications, because the optical loss in light absorption by the C—Cl bond is lower than that by C—F bond. Although some light absorption loss can be generated due to overtone by —NH bond in the polyamideimide according to the present invention, at the wavelength range for optical communications, the polyamideimide with a limited number of —NH bonds existing in its molecule is a good optical material in birefringence and thermal expansion in view of its flexible molecular structure, compared to the conventional polyimide.

In a polyamideimide according to the present invention, H of C—H bond is substituted for halogen atom or nitro group. Here, the halogen atom substituting for H is not limited to a specific halogen atom, and combinations of various halogen atoms are possible.

Hereinafter, a method for preparing the polyamideimide according to the present invention will be described.

A method for preparing bis(3,5,6-trisubstituted-4-halogenformyl-1,2-phthalic imide) derivative (A) will be described with reference to the reaction formula (1).

1,2,4-trimethylbenzene (C) is reacted with a halogenated compound such as hydrogen bromide, hydrogen chloride or hydrogen fluorine, or a nitration agent such as nitric acid to prepare 3,5,6-trisubstituted-1,2,4-trimethylbenzene (D).

The 3,5,6-trisubstituted-1,2,4-trimethylbenzene (D) is oxidized by various oxidation methods using a transition metal catalyst, potassium permanganate or nitric acid, to obtain 3,5,6-trisubstituted-1,2,4-benzenetricarboxylic acid (E).

The 3,5,6-trisubstituted-1,2,4-benzenetricarboxylic acid (E) is reacted with acetic acid and acetic anhydride to prepare 3,5,6-trisubstituted-4-carboxylic acid-1,2-phthalic anhydride (F), and is reacted with a diamine compound (B') to prepare bis(3,5,6-trisubstituted-4-carboxylic acid-1,2-phthalic imide) derivative (G). An alternative preparation of compound (G) involves use of an acid halide derivative of compound (F), which is compound (I) as shown below, where U represents Cl, Br or I.

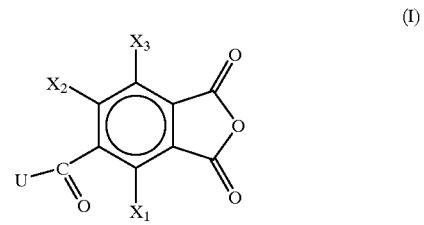

(I)

The bis(3,5,6-trisubstituted-4-carboxylic acid-1,2-phthalic imide) derivative (G) is reacted with a halogenated compound such as thionyl chloride to prepare bis(3,5,6-trisubstituted-4-halogenformyl-1,2-phthalic imide) derivative (A).

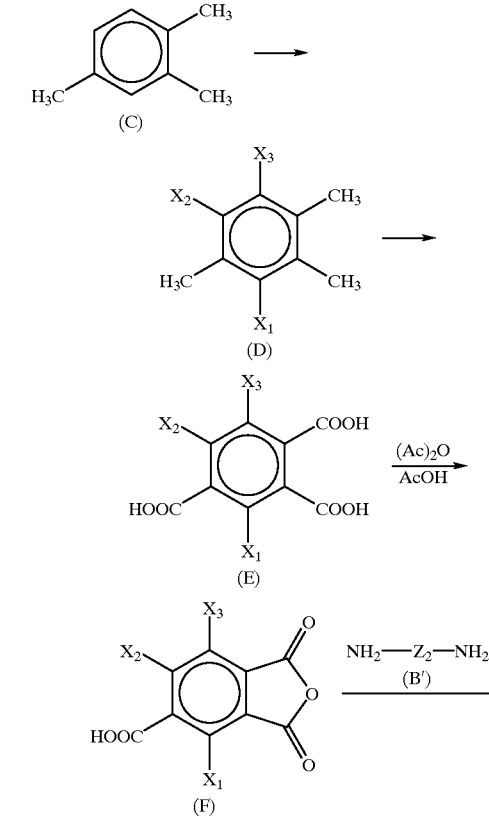

-continued

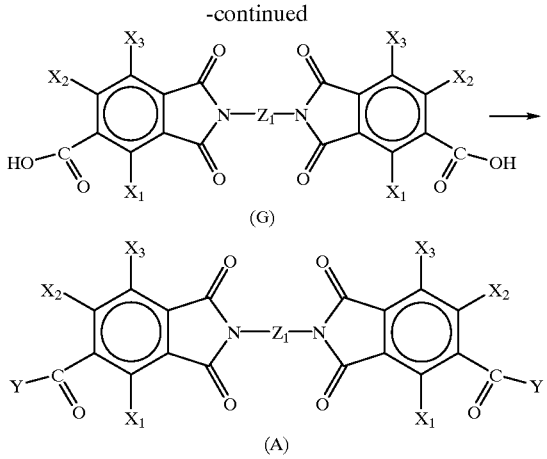

(G)

(A)

In the reaction formulae above, $X_1$, $X_2$ and $X_3$ are independently selected from the group consisting of halogen atom, halogenated alkyl group, halogenated alkoxy group, halogenated aromatic ring group, $-NO_2$, $-OR^1$ and $SR^1$ (where $R^1$ is a halogenated alkyl or halogenated aromatic ring groups), $Z_1$ is selected from the group consisting of divalent halogenated aliphatic hydrocarbon, divalent halogenated aliphatic cyclic hydrocarbon or divalent halogenated aromatic hydrocarbon, and Y is halogen atom.

The synthesis conditions of the above-described bis(3,5,6-trisubstituted-4-halogenformyl-1,2-phthalic imide) derivative (A) will now be described in detail.

1,2,4-trimethylbenzene and iodine are dissolved with chloroform, a halogenated compound such as hydrogen bromide, hydrogen chloride or hydrogen fluorine, or a nitration agent such as nitric acid are added thereto, and then reacted violently at 0~40° C. for 15 minutes to 24 hours. The precipitate formed in the reaction mixture is filtered to obtain 3,5,6-trisubstituted-1,2,4-trimethylbenzene.

Pyridine and water are added to the 3,5,6-trisubstituted-1,2,4-trimethylbenzene and heated at 100° C., potassium permanganate is added thereto and reacted at 50~115° C. for 2 to 24 hours. While the reaction mixture is hot, it is filtered and then distilled under vacuum to remove pyridine from the reaction mixture.

Water and sodium hydroxide are added to the resultant to then be heated at 50~100° C., and potassium permanganate is added thereto to then be reacted for 2 to 24 hours. Subsequently, the obtained reaction mixture is acidified using a 5N-HCl solution, and then the solvent is distilled to obtain 3,5,6-trisubstitutedbenzene-1,2,4-tricarboxylic acid.

A halogenated compound such as thionyl chloride is added to the 3,5,6-trisubstitutedbenzene-1,2,4-carboxylic acid, and is reacted for 30 minutes to 24 hours to obtain 3,5,6-trisubstituted-4-carboxylic acid-1,2-phthalic anhydride.

The 3,5,6-trisubstituted-4-carboxylic acid-1,2-phthalic anhydride and a diamine compound (B') are reacted at 0~200° C. for 4 to 48 hours. The obtained resultant is precipitated in distilled water or an organic solvent such as methyl alcohol, filtered and dried to obtain bis(3,5,6-trisubstituted-4-carboxylic acid-1,2-phthalic imide) derivative (G). The derivative (G) is reacted with a halogenated compound such as thionyl chloride at 0~50° C. and heated at 80~100° C. for 24 to 72 hours to prepare bis(3,5,6-trisubstituted-4-halogenformyl-1,2-phthalic imide) derivative (A).

The bis(3,5,6-trisubstituted-4-halogenformyl-1,2-phthalic imide) derivative (A) and a diamine compound (B) are dissolved in a polar solvent and reacted at −20~50° C. for 2 to 300 hours. Here, as the polar solvent, N,N-dimethyl formamide, N,N-dimethyl acetamide, N,N-dimethyl sulfoxide or N-methyl-2 pyrrolidone is used.

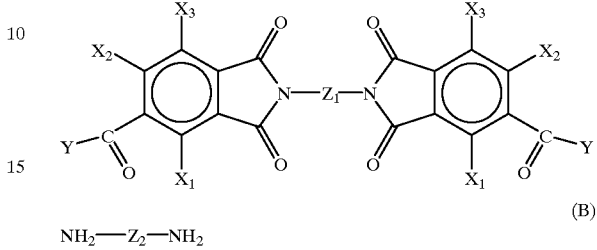

(A)

$NH_2-Z_2-NH_2$ (B)

The reaction mixture is precipitated in distilled water or an organic solvent such as methyl alcohol, to form a polyamideamic acid that is an intermediate. The polyamideamic acid is imidized to prepare the polyamideimide.

Imidization of the polyamideamic acid into the polyamideimide can be performed by a chemical method or a thermal method. In the chemical method, acetic anhydride and pyridine are added to a mixture containing bis(3,5,6-trisubstituted-4-halogenformyl-1,2-phthalic imide) derivative(A) and a diamine compound(B) and heated at 60~150° C. Otherwise, toluene is added to the mixture containing the bis(3,5,6-trisubstituted-4-halogenformyl-1,2-phthalic imide)derivative (A) and a diamine compound (B), and heated to a boiling point of toluene. In the thermal method, the polyamideamic acid is heated by steps within a temperature range of 50~400° C.

It can be understood that imidization of polyamideamic acid into polyamideimide is measured by a thermogravimetry analysis (TGA) method at 200~250° C., and thermal decomposition occurs at 300 to 500° C., specifically at 375 to 425° C. The polyamideimide according to the present invention, obtained by the above method, has a glass transition temperature in the range of approximately 220 to 320° C. and a molecular weight in the range of approximately $1 \times 10^4$ to $5 \times 10^5$ Dalton. The molecular weight of the polyamideimide is determined using gel permeation chromatography (GPC).

Diamine compounds B and B' are not limited to a specific compound. For example, possible diamine compounds (B) and (B') include bis(perfluorophenyl)alkanes, bis(perfluorophenyl)sulfones, bis(perfluorophenyl)ethers or α, α'-bis(perfluorophenyl)diisopropylbenzenes. In detail, the diamine compound (B) may be tetrafluoro-1,2-phenylenediamine, tetrafluoro-1,3-phenylendiamine, tetrafluoro-1,4-phenyldiamine, tetrachloro-1,2-phenylenediamine, tetrachloro-1,3-phenylenediamine, tetrachloro-1,4-phenylenediamine, hexafluoro-1,5-diaminonaphthalene, hexafluoro-2,6-diaminonaphthalene, 3-trifluoromethyltrifluoro-1,2-phenylenediamine, 4-trifluoromethyltrifluoro-1,2-phenylenediamine, 2-trifluoromethyltrifluoro-1,3-phenylenediamine, 4-trifluoromethyltrifluoro-1,3-phenylenediamine, 5-trifluoromethyltrifluoro-1,3-phenylenediamine, 2-trifluoromethyltrifluoro-1,4-phenylenediamine, 3-pentafluoroethyltrifluoro-1,2-phenylenediamine, 4-pentafluoroethyltrifluoro-1,2-phenylenediamine, 2-pentafluoroethyltrifluoro-1,3-phenylenediamine, 4-pentafluoroethyltrifluoro-1,3-phenylenediamine, 5-pentafluoroethyltrifluoro-1,3-phenylenediamine, 2-pentafluoroethyltrifluoro-1,4-phenylenediamine, 3,4-bis(trifluoromethyl)difluoro-1,2-phenylenediamine, 3,5-bis(trifluoromethyl)difluoro-1,2-phenylenediamine, 2,4-bis(trifluoromethyl)difluoro-1,3-phenylenediamine, 4,5-bis(trifluoromethyl)difluoro-1,3-phenylenediamine, 2,3-bis(trifluoromethyl)difluoro-1,4-phenylenediamine, 2,5-bis(trifluoromethyl)difluoro-1,4-phenylenediamine, 3,4-bis(trifluoromethyl)difluoro-1,2-phenylenediamine, 3-trifluoromethoxytrifluoro-1,2-phenylenediamine, 4-trifluoromethyltrifluoro-1,2-phenylenediamine, 2-trifluoromethoxytrifluoro-1,3-phenylenediamine, 4-trifluoromethoxytrifluoro-1,3-phenylenediamine, 5-trifluoromethoxytrifluoro-1,3-phenylenediamine, 2-trifluoromethoxytrifluoro-1,4-phenylenediamine, 3,4,5-tris(trifluoromethyl)fluoro-1,2-phenylenediamine, 3,4,6-tris(trifluoromethyl)fluoro-1,2-phenylenediamine, 2,4,5-tris(trifluoromethyl)fluoro-1,3-phenylenediamine, 2,4,6-tris(trifluoromethyl)fluoro-1,3-phenylenediamine, 4,5,6-tris(trifluoromethyl)fluoro-1,3 -phenylenediamine, tetrakis(trifluoromethyl)-1,2-phenylenediamine, tetrakis(trifluoromethyl)-1,3-phenylenediamine, tetrakis(trifluoromethyl)-1,4-phenylenediamine, 3,3'-diaminooctafluorobiphenyl, 3,4'-diaminooctafluorobiphenyl, 4,4'-diaminooctafluorobiphenyl, 3,3'-diaminooctachlorobiphenyl, 3,4'-diaminooctachlorobiphenyl, 4,4'-diaminooctachlorobiphenyl, 2,2'-bis(trichloromethyl)-4,4'-diaminohexachlorobiphenyl, 3,3'-bis(trichloromethyl)-4,4'-diaminohexafluorobiphenyl, bis(4-aminotetrafluorophenyl)dichloromethane, 1,2-bis(4-aminotetrafluorophenyl)tetrachloroethane, 2,2-bis(4-aminotetrafluorophenyl)hexachloropropane, 2,2'-bis(trifluoromethyl)-4,4'-diaminohexachlorobiphenyl, 3,3'-bis(trifluoromethyl)-4,4'-diaminohexafluorobiphenyl, bis(4-aminotetrafluorophenyl)difluoromethane, 1,2-bis(4-aminotetrafluorophenyl)tetrachloroethane, 2,2-bis(4-aminotetrafluorophenyl)hexafluoropropane, bis(3-aminotetrafluorophenyl)ether, 3,4'-diaminooctafluorobiphenylether, bis(4-aminotetrafluorophenyl)ether, bis(3-aminotetrachlorophenyl)ether, 3,4'-diaminooctachlorobiphenylether, bis(4-aminotetrachlorophenyl)ether, 3,3'-diaminooctafluorobenzophenone, 3,4'-diaminooctafluorobenzophenone, 4,4'-diaminooctafluorobenzophenone, bis(3-aminotetrafluorophenyl)sulfone, 3,4'-diaminooctafluorobiphenylsulfone, bis(4-aminotetrafluorophenylsulfone), bis(3-aminotetrafluorophenyl)sulfide, 3,4'-diaminooctafluorobiphenylsulfide, bis(4-aminotetrafluorophenyl)sulfide, 4-aminotetrafluorophenoxy-4'-aminotetrafluorophenyldifluoromethane, bis(4-amninotetrafluorophenoxy)difluoromethane, 1,2-bis(4-aminotetrafluorophenoxy)tetrafluoroethane, 2,2-bis(4-aminotetrafluorophenoxy)hexafluoropropane, bis(4-aminotetrafluorophenoxy)dichloromethane, 1,2-bis(4-aminotetrafluorophenoxy) tetrachloroethane, 2,2-bis(4-aminotetraflurophenoxy)hexachloropropane, 4,4"-diaminododecafluoro-p-terphenyl, 2',3'-bis(trifluoromethyl)-4,4"-diamino-p-terphenyl, 2,2"-bis(trifluoromethyl)-4,4"-diamino-p-terphenyl, 2',5'-bis(trifluoromethyl)-4,4"-diamino-p-terphenyl, 2,7-diaminohexafluorodibenzofuran, 1,4-bis(4-aminotetrafluorophenoxy)tetrafluorobenzene, 2,6-diaminohexafluoronaphthalene, 2,7-diaminooctafluorophenanthrene, 2,6-diaminooctafluoroanthracene, 2,7-diaminohexathianthrene, 2,6-diaminohexafluoroanthiaquinone, 2,6-diaminohexafluorobiphenylene, 2,6-diaminooxtafluoroanthrone, 2,7-diaminotetrafluorodibenz[b,e] 1,4-dioxane, 2,2'-bis(4-aminophenyl)hexafluoropropane, 2,2'-bis(4-aminophenyl)hexachloropropane, 2,4-diaminobenzotrifluoride, 2,2-bis(trifluoromethyl)benzidine, 2,2-bis[4-(4-amino-2-trifluorophenoxy)phenyl]hexafluoropropane, 2,2-bis[4-(4-amino-2-trifluorophenoxy)phenyl]hexachloropropane, 3,4-diaminobenzotrifluoride, 3,5-diaminobenzotrifluoride, 2,5-diaminobenzotrifluoride, 2,2-bis[4-(4-aminophenoxy)phenyl]hexafluoropropane, 2,2-bis[4-(4-amino phenoxy)phenyl]hexachloropropane, or 3,4-diamino-1-fluorobenzene.

Hereinafter, the present invention will be described in detail through the following examples. However, the present invention is not limited to the following examples.

MONOMER SYNTHESIS EXAMPLE 1

0.008 mol of 3,5,6-trichloro-4-chloroformylphthalic anhydride was dissolved in 50 ml of N-methyl-2-pyrrolidone at 50° C. and then the temperature of the reaction mixture was lowered to room temperature.

0.04 mol of 1,3-diaminobenzene was added to the reaction mixture and then reacted at room temperature for 5 hours. Subsequently, the reaction mixture was reacted at 180° C. for 4 hours.

After the reaction was completed, the reaction mixture was added to distilled water to form a precipitate. The obtained precipitate was filtered and dried. 0.15 mol of thionyl chloride and 0.0076 mol of pyridine were added to 0.0038 mol of the resultant.

The reaction mixture was reacted at 0~50° C. Then, the reaction mixture was distilled under vacuum to remove the solvent therefrom and washed with distilled water several times. Then, the obtained resultant was dried in a vacuum oven set to 80° C. for 24 hours, resulting in bis[trichloro-4-chloroformylphthalic imide] derivative (BTHP) (1) (yield: 92%).

MONOMER SYNTHESIS EXAMPLE 2

0.008 mol of 3,5,6-trichloro-4-chloroformylphthalic anhydride was dissolved in 50 ml of N-methyl-2-pyrrolidone at 50° C. and then the temperature of the reaction mixture was lowered to room temperature.

0.04 mol of 4,4'-diaminobiphenyl was added to the reaction mixture and then reacted at room temperature for 5 hours. Subsequently, the reaction mixture was reacted at 180° C. for 4 hours.

After the reaction was completed, the reaction mixture was added to distilled water to form a precipitate. The obtained precipitate was filtered and dried.

0.15 mol of thionyl chloride and 0.0076 mol of pyridine were added to 0.0038 mol of the resultant.

The reaction mixture was reacted at 0~50° C. Then, the reaction mixture was distilled under vacuum to remove the solvent therefrom and washed with distilled water several times. Then, the obtained resultant material was dried in a vacuum oven set to 80° C. for 24 hours, resulting BTHP (2) (yield: 87%).

MONOMER SYNTHESIS EXAMPLE 3

0.008 mol of 3,5,6-trichloro-4-chloroformylphthalic anhydride was dissolved in 50 ml of N-methyl-2- pyrrolidone at 50° C. and then the temperature of the reaction mixture was lowered to room temperature.

0.04 mol of 1,3-diaminotetrafluorobenzene was added to the reaction mixture and then reacted at room temperature for 5 hours. Subsequently, the reaction mixture was reacted at 180° C for 4 hours.

After the reaction was completed, the reaction mixture was added to distilled water to form a precipitate. The obtained precipitate was filtered and dried.

0.15 mol of thionyl chloride and 0.0076 mol of pyridine were added to 0.0038 mol of the resultant.

The reaction mixture was reacted at 0~50° C. Then, the reaction mixture was distilled under vacuum to remove the solvent therefrom and washed with distilled water several times. Then, the obtained resultant material was dried in a vacuum oven set to 80°0 C. for 24 hours, resulting in BTHP (3) (yield: 86%).

MONOMER SYNTHESIS EXAMPLE 4

0.008 mol of 3,5,6-trichloro-4-chloroformylphthalic anhydride was dissolved in 50 ml of N-methyl-2-pyrrolidone at 50° C. and then the temperature of the reaction mixture was lowered to room temperature.

0.04 mol of 4,4'-diaminooctafluorobiphenyl was added to the reaction mixture and then reacted at room temperature for 5 hours. Subsequently, the reaction mixture was reacted at 180° C. for 4 hours.

After the reaction was completed, the reaction mixture was added to distilled water to form a precipitate. The obtained precipitate was filtered and dried.

0.15 mol of thionyl chloride and 0.0076 mol of pyridine were added to 0.0038 mol of the resultant.

The reaction mixture was reacted at 0~50° C. Then, the reaction mixture was distilled under vacuum to remove the solvent therefrom and washed with distilled water several times. Then, the obtained resultant was dried in a vacuum oven set to 80° C. for 24 hours, resulting in BTHP (4) (yield: 80%).

MONOMER SYNTHESIS EXAMPLE 5

0.008 mol of 3,5,6-trichloro-4-chloroformylphthalic anhychide was dissolved in 50 ml of N-methyl-2-pyrrolidone being at 50° C. and then the temperature of the reaction mixture was lowered to room temperature.

0.04 mol of 2,2-bis(4-aminophenyl) propane was added to the reaction mixture and then reacted at room temperature for 5 hours. Subsequently, the reaction mixture was reacted at 180° C. for 4 hours.

After the reaction was completed, the reaction mixture was added to distilled water to form a precipitate. The obtained precipitate was filtered and dried.

0.15 mol of thionyl chloride and 0.0076 mol of pyridine were added to 0.0038 mol of the resultant.

The reaction mixture was reacted at 0~50° C. Then, the reaction mixture was distilled under vacuum to remove the solvent therefrom and washed with distilled water several times. Then, the obtained resultant material was dried in a vacuum oven set to 80° C. for 24 hours, resulting in BTHP (5) (yield: 85%).

MONOMER SYNTHESIS EXAMPLE 6

0.008 mol of 3,5,6-trichloro-4-chloroformylphthalic anhydride was dissolved in 50 ml of N-methyl-2-pyrrolidone at 50° C. and then the temperature of the reaction mixture was lowered to room temperature.

0.04 mol of 2,2-bis(4-aminophenyl)hexachlorpropane was added to the reaction mixture and then reacted at room temperature for 5 hours. Subsequently, the reaction mixture was reacted at 180° C. for 4 hours.

After the reaction was completed, the reaction mixture was added to distilled water to form a precipitate. The obtained precipitate was filtered and dried.

0.15 mol of thionyl chloride and 0.0076 mol of pyridine were added to 0.0038 mol of the resultant.

The reaction mixture was reacted at 0~50° C. Then, the reaction mixture was distilled under vacuum to remove the solvent therefrom and washed with distilled water several times. Then, the obtained resultant was dried in a vacuum oven set to 80° C. for 24 hours, resulting in BTHP (6) (yield: 82%).

MONOMER SYNTHESIS EXAMPLE 7

0.008 mol of 3,5,6-trichloro-4-chloroformylphthalic anhydride was dissolved in 50ml of N-methyl-2-pyrrolidone being at 50° C. and then the temperature of the reaction mixture was lowered to room temperature.

0.04 mol of 2,2'-bis(4-aminotetrafluorophenylhexachloropropane was added to the reaction mixture and then reacted at room temperature for 5 hours. Subsequently, the reaction mixture was reacted at 180° C. for 4 hours.

After the reaction was completed, the reaction mixture was added to distilled water to form a precipitate. The obtained precipitate was filtered and dried. 0.15 mol of thionyl chloride and 0.0076 mol of pyridine were added to 0.0038 mol of the resultant.

The reaction mixture was reacted at 0~50° C. Then, the reaction mixture was distilled under vacuum to remove the solvent therefrom and washed with distilled water several times. Then, the obtained resultant was dried in a vacuum oven set to 80° C. for 24 hours, resulting in BTHP (7) (yield: 81%).

MONOMER SYNTHESIS EXAMPLE 8

0.008 mol of 3,5,6-trichloro-4-chloroformylphthalic anhydride was dissolved in 50 ml of N-methyl-2-pyrrolidone being at 50° C. and then the temperature of the reaction mixture was lowered to room temperature.

0.04 mol of 2,2'-bis(4-aminotetrafluorophenyl) hexafluorophenyl was added to the reaction mixture and then reacted at room temperature for 5 hours. Subsequently, the reaction mixture was reacted at 180° C. for 4 hours.

After the reaction was completed, the reaction mixture is added to distilled water to form a precipitate. The obtained precipitate was filtered and dried.

0.15 mol of thionyl chloride and 0.0076 mol of pyridine were added to 0.0038 mol of the resultant.

The reaction mixture was reacted at 0~50° C. Then, the reaction mixture was distilled under vacuum to remove the solvent therefrom and washed with distilled water several times. Then, the obtained resultant material was dried in a vacuum oven set to 80° C. for 24 hours, resulting in BTHP (8) (yield: 78%).

MONOMER SYNTHESIS EXAMPLE 9

0.008 mol of 3,5,6-trichloro-4-chloroformylphthalic anhydride was dissolved in 50 ml of N-methyl-2-pyrrolidone at 50° C. and then the temperature of the reaction mixture was lowered to room temperature.

0.04 mol of bis(4-aminophenyl) ether was added to the reaction mixture and then reacted at room temperature for 5 hours. Subsequently, the reaction mixture was reacted at 180° C. for 4 hours.

After the reaction was completed, the reaction mixture was added to distilled water to form a precipitate. The obtained precipitate was filtered and dried.

0.15 mol of thionyl chloride and 0.0076 mol of pyridine were added to 0.0038 mol of the resultant.

The reaction mixture was reacted at 0~50 C. Then, the reaction mixture was distilled under vacuum to remove the solvent therefrom and washed with distilled water several times. Then, the obtained resultant material was dried in a vacuum oven set to 80° C. for 24 hours, resulting in BTHP (9) (yield: 81%).

MONOMER SYNTHESIS EXAMPLE 10

0.008 mol of 3,5,6-trichloro-4-chloroformylphthalic anhydride was dissolved in 50ml of N-methyl-2-pyrrolidone at 50° C. and then the temperature of the reaction mixture was lowered to room temperature.

0.04 mol of bis(4-aminotetrachlorophenyl) ether was added to the reaction mixture and then reacted at room temperature for 5 hours. Subsequently, the reaction mixture was reacted at 180° C. for 4 hours.

After the reaction was completed, the reaction mixture is added to distilled water to form a precipitate. The obtained precipitate was filtered and dried.

0.15 mol of thionyl chloride and 0.0076 mol of pyridine were added to 0.0038 mol of the resultant material.

The reaction mixture was reacted at 0~50° C. Then, the reaction mixture was distilled under vacuum to remove the solvent therefrom and washed with distilled water several times. Then, the obtained resultant was dried in a vacuum oven set to 80° C. for 24 hours, resulting in BTHP (10) (yield: 79%).

MONOMER SYNTHESIS EXAMPLE 11

0.008 mol of 3,5,6-trichloro-4-chloroformylphthalic anhydride was dissolved in 50 ml of N-methyl-2-pyrrolidone at 50° C. and then the temperature of there action mixture was lowered to room temperature.

0.04 mol of bis(4-aminotetrafluorophenyl)sulfone was added to the reaction mixture and then reacted at room temperature for 5 hours. Subsequently, the reaction mixture was reacted at 180° C. for4hours.

After the reaction was completed, the reaction mixture was added to distilled water to form a precipitate. The obtained precipitate was filtered and dried.

0.15 mol of thionyl chloride and 0.0076 mol of pyridine were added to 0.0038 mol of the resultant.

The reaction mixture was reacted at 0~50° C. Then, the reaction mixture was distilled under vacuum to remove the solvent therefrom and washed with distilled water several times. Then, the obtained resultant was dried in a vacuum oven set to 80° C. for 24 hours, resulting in BTHP (11) (yield: 75%).

MONOMER SYNTHESIS EXAMPLE 12

0.008 mol of 3,5,6-trichloro-4-chloroformylphthalic anhydride was dissolved in 50ml of N-methyl-2-pyrrolidone at 50° C. and then the temperature of the reaction mixture was lowered to room temperature.

0.04 mol of 2,2'-bis(trifluoromethyl)benzidine was added to the reaction mixture and then reacted at room temperature for 5 hours. Subsequently, the reaction mixture was reacted at 180° C. for 4 hours.

After the reaction was completed, the reaction mixture was added to distilled water to form a precipitate. The obtained precipitate was filtered and dried.

0.15 mol of thionyl chloride and 0.0076 mol of pyridine were added to 0.0038 mol of the resultant.

The reaction mixture was reacted at 0~50° C. Then, the reaction mixture was distilled under vacuum to remove the solvent therefrom and washed with distilled water several times. Then, the obtained resultant was dried in a vacuum oven set to 80° C. for 24 hours, resulting in BTHP (12) (yield: 76%).

MONOMER SYNTHESIS EXAMPLE 13

0.008 mol of 3,5,6-trichloro-4-chloroformylphthalic anhydride was dissolved in 50ml of N-methyl-2-pyrrolidone at 50° C. and then the temperature of the reaction mixture was lowered to room temperature.

0.04 mol of bis(4-aminotetrafluorophenyl) difluoromethane was added to the reaction mixture and then reacted at room temperature for 5 hours. Subsequently, the reaction mixture was reacted at 180° C. for 4 hours.

After the reaction was completed, the reaction mixture was added to distilled water to form a precipitate. The obtained precipitate was filtered and dried.

0.15 mol of thionyl chloride and 0.0076 mol of pyridine were added to 0.0038 mol of the resultant.

The reaction mixture was reacted at 0~50° C. Then,there action mixture was distilled under vacuum to remove the solvent therefrom and washed with distilled water several times. Then, the obtained resultant was dried in a vacuum oven set to 80° C. for 24 hours, resulting in BTHP (13) (yield: 73%).

The following examples illustrate preparation of polyamideimides of general formula (1):

POLYMER EXAMPLE 1

A mixture containing 0.001 mol of 1,3-phenylenebis(3,5, 6-trichloro-4-chloroformylphthalic imide), 0.001 mol of 1,3-diaminobenzene and 3 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours and heated to 250° C, resulting in polyamideimide (PAI) (1) (yield: 91%).

POLYMER EXAMPLE 2

A mixture containing 0.001 mol of 1,3-phenylenebis(3,5, 6-trichloro-4-chloroformyl phthalic imide), 0.001 mol of 4,4'-diaminobiphenyl and 4 ml of N,N-dimethylacetamide was reacted under a nitrogen atmosphere at room temperature for 7 days.

The reaction mixture was added to distilled water to form a precipitate. The obtained precipitate was filtered and washed with distilled water several times. Then, the resultant material was dried in a vacuum oven set to 60° C. for 24 hours and heated to 250° C., resulting in PAI (2) (yield: 88%).

POLYMER EXAMPLE 3

A mixture containing 0.001 mol of 2,4,5,6-tetrafluorophenylene-1,3-bis(3,5,6-trichloro-4- chloroformylphthalic imide), 0.001 mol of 1,3-diaminotetrafluorobenzene and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, and acetic acid anhydride and pyridine were added thereto and heated.

The reaction mixture was added to distilled water to form a precipitate. The obtained precipitate was filtered and washed with distilled water several times.

The resultant was dried in a vacuum oven set to 60° C. for 24 hours, resulting in PAI (3) (yield: 86%).

POLYMER EXAMPLE 4

A mixture containing 0.001 mol of octafluorobiphenyl-4,4'-bis(3,5,6-trichloro-4-chloroformyl phthalic imide), 0.001 mol of 4,4'-diaminooctafluorobiphenyl and 3 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, and acetic acid anhydride and pyridine were added thereto and heated.

The reaction mixture was added to distilled water to form a precipitate. The obtained precipitate was filtered and washed with distilled water several times.

The resultant was dried in a vacuum oven set to 60° C. for 24 hours, resulting in PAI (4) (yield: 83%).

POLYMER EXAMPLE 5

A mixture containing 0.001 mol of octafluorobiphenyl-4,4'-bis(3,5,6-trichloro-4-chloroformyl phthalic imide), 0.001 mol of bis(4-aminophenyl) methane and 4 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours and heated to 250° C., resulting in PAI (5) (yield: 81%).

POLYMER EXAMPLE 6

A mixture containing 0.001 mol of 1,3-hexachloroisopropylidene-2,2-diphenyl bis(3,5,6-trichloro-4-chloroformyl phthalic imide), 0.001 mol of bis(4-aminotetrafluorophenyl) difluoromethane and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant material was dried in a vacuum oven set to 60° C. for 24 hours, and acetic acid anhydride and pyridine were added thereto and heated.

The reaction mixture was added to distilled water to form a precipitate. The obtained precipitate was filtered and washed with distilled water several times.

The resultant material was dried in a vacuum oven set to 60° C. for 24 hours, resulting in polyamideimide PAI (6) (yield: 78%).

POLYMER EXAMPLE 7

A mixture containing 0.001 mol of 1,3-hexachloroisopropylidene-2,2-diphenyl bis(3,5,6-trichloro-4-chloroformyl phthalic imide), 0.001 mol of 2,2-bis(4-aminophenyl) propane and 3 ml of N,N-dimethylacetamide was reacted under anitrogen atmosphere at room temperature for 9 days.

The reaction mixture was added to distilled water to form a precipitate. The obtained precipitate was filtered and washed with distilled water several times. Then, the resultant material was dried in a vacuum oven set to 60° C. for 24 hours, and acetic acid anhydride and pyridine were added thereto and heated.

The reaction mixture was added to distilled water to form a precipitate. The obtained precipitate was filtered and washed with distilled water several times.

The resultant material was dried in a vacuum oven set to 60° C. for 24 hours, resulting in PAI (7) (yield: 81 %).

POLYMER EXAMPLE 8

A mixture containing 0.001 mol of 1,3-hexachloroisopropylidene-2,2-octafluorobiphenyl-4,4'-bis(3,5,6-trichloro-4-chloroformyl phthalic imide), 0.001 mol of 2,2-bis(4-aminophenyl)hexachloropropane and 4 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours and heated to 250° C., resulting in PAI (8) (yield: 76%).

POLYMER EXAMPLE 9

A mixture containing 0.001 mol of 1,3-hexachloroisopropylidene-2,2-octafluorobiphenyl 4,4'-bis(3,5,6-trichloro-4-chloroformyl phthalic imide), 0.001 mol of 2,2-bis(4-aminotetrafluorophenyl) hexafluoropropane and 3 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours and heated to 250° C., resulting in PAI (9) (yield: 73%).

POLYMER EXAMPLE 10

A mixture containing 0.001 mol of 4,4'-octachlorodiphenylene ether bis(3,5,6-trichloro-4-chloroformyl phthalic imide), 0.001 mol of 2,2-bis(4-tetrafluorophenyl)hexachloropropane and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours and heated to 250° C., resulting in PAI (10) (yield: 74%)

POLYMER EXAMPLE 11

A mixture containing 0.001 mol of 4,4'-octachlorodiphenylene ether bis(3,5,6-trichloro-4-chloroformyl phthalic imide), 0.001 mol of bis(4-aminophenyl) ether and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours and heated to 250° C., resulting in PAI (11) (yield: 85%).

POLYMER EXAMPLE 12

A mixture containing 0.001 mol of 4,4'-octachlorodiphenylene ether bis(3,5,6-trichloro-4-chloroformyl phthalic imide), 0.001 mol of bis(4-aminotetrachlorophenyl) ether and 5 ml of N,N-dimethylacetamide was reacted under a nitrogen atmosphere at room temperature for 9 days.

The reaction mixture was added to distilled water to form a precipitate. The obtained precipitate was filtered and washed with distilled water several times. Then, the resultant was dried in a vacuum oven set to 60° C. for 24 hours, and acetic acid anhydride and pyridine were added thereto and heated.

The reaction mixture was added to distilled water to form a precipitate. The obtained precipitate was filtered and washed with distilled water several times. The resultant was dried in a vacuum oven set to 60° C. for 24 hours, resulting in PAI (12) (yield: 74%).

Thermal stability, optical loss at a near infrared wavelength range of 1,000~1,700 nm, and film processibility of each of the polyamideimides PAIs (1) through (12) synthesized by Polymer Examples 1 through 12 were measured. The thermal stability of the polyamideimides was measured using a thermogravimetry analysis (TGA) method.

As a result, it could be seen that the thermal stability was good from the fact that the PAIs 1 through 12 experienced thermal decomposition at 350~450° C. Also, it was observed that the optical loss of the polyamideimide was similar to or less than the conventional perfluorinated polyamideimide. Also, while the conventional partially fluorinated or perfluorinated polyimide had a poor film processibility, the polyamideimides obtained by Examples 1 through 12 had an improved film processibility compared to the conventional polyimide.

The polyamideimide according to the present invention has a higher refractive index than the conventional fluorinated polyimide. Thus, when using such polyamideimide as a material for a core of an optical fiber, the selection range on the material for cladding becomes wide. Also, the coating property and adhesiveness to a substrate are improved compared to the conventional polyimide, thereby providing a good film processibility and thermal stability.

Also, since the polyamideimide according to the present invention can minimize optical loss at a near infrared wavelength range, the polyamideimide of the present invention is very useful as an optical material in the optical communications field adopting the light of near infrared wavelength. That is, the polyamideimide according to the present invention can be used as a functional polymeric material having a low light absorption loss characteristic which is essential for manufacturing an optical device for optical waveguiding, such as optoelectronic integrated circuit (OEIC), opto-electrical mixed wiring board (OEMWB), hybrid integration device, multi-chip module (MCM) or plastic optical fiber.

What is claimed is:

1. A polymer for optical communications, comprising a repeating unit represented by the formula:

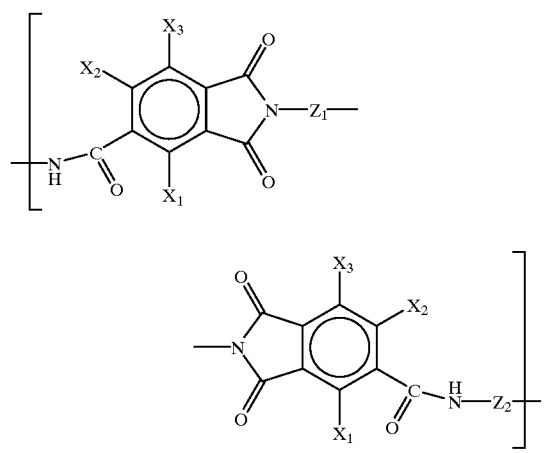

where $X_1$, $X_2$ and $X_3$ are independently selected from the group consisting of halogen atom, halogenated alkyl group, halogenated alkoxy group, halogenated aromatic ring group, —$NO_2$, —$OR^1$ and $SR^1$ (where $R^1$ is a halogenated alkyl or halogenated aromatic ring groups);

and where $Z_1$ and $Z_2$ are selected from the group consisting of divalent halogenated aliphatic hydrocarbon, divalent halogenated aliphatic cyclic hydrocarbon or divalent halogenated aromatic hydrocarbon.

2. The polymer of claim 1, wherein $X_1$, $X_2$ and $X_3$ are the same and selected from the group consisting of chloride atom, partially chlorinated or perchlorinated allyl group, partially chlorinated or perchlorinated aromatic ring group, partially chlorinated or perchlorinated alkoxy group, and partially chlorinated or perchlorinated phenoxy group.

3. The polymer of claim 1, wherein $Z_1$ and $Z_2$ are selected from the group consisting of divalent halogenated aliphatic hydrocarbon of $C_1$–$C_{25}$, divalent halogenated aliphatic cyclic hydrocarbon of $C_1$–$C_{25}$, and divalent halogenated aromatic hydrocarbon of $C_6$–$C_{25}$.

4. The polymer of claim 1, wherein $Z_1$ and $Z_2$ are selected from the group represented by the following formula:

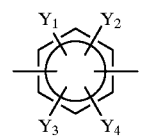

wherein $Y_1$, $Y_2$, $Y_3$ and $Y_4$ are independently selected from the group consisting of halogen atom, halogenated alkyl group, halogenated alkoxy group, halogenated aromatic ring group, $NO_2$, —$OR^1$ and $SR^1$ (where $R^1$ is a halogenated alkyl or halogenated aromatic ring groups).

5. The polyamideimide according to claim 1, wherein $Z_1$ and $Z_2$ are selected from the group represented by the following formula:

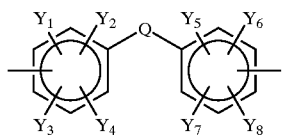

wherein $Y_1$, $Y_2$, $Y_3$, $Y_4$, $Y_5$, $Y_6$, $Y_7$ and $Y_8$ are independently selected from the group consisting of halogen atom, halogenated alkyl group, halogenated alkoxy group, halogenated aromatic ring group, —$NO_2$, —$OR^1$ and $SR^1$ (where $R^1$ is halogenated alkyl or halogenated aromatic ring groups); and Q is a simple chemical bond or selected from the group consisting of, —O—, —CO—, —$SO_2$—, —S—, —$(OT)_m$—, $(OT)_m$— and —$(OTO)_m$— (where T is halogenated alkylene or halogenated arylene groups and m is an integer from 1 to 10).

6. The polyamideimide of claim 1, wherein the polyamideimide has a molecular weight in the range of approximately $1 \times 10^4$ to $5 \times 10^5$ Dalton.

7. The polyamideimide of claim 1, wherein the polyamideimide has a thermal decomposition temperature in the range of approximately 300 to 500° C.

8. The polyamideimide of claim 1, wherein the polyamideimide has a glass transition temperature in the range of approximately 220 to 320° C.

9. A method for preparing a polymer for optical communications, comprising the steps of:

(a) reacting a bis(3,5,6-trisubstituted-4-halogenformyl-1,2-phthalic imide) derivative of formula:

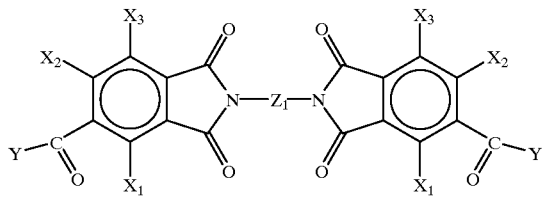

with a diamine compound of formula $H_2N$—$Z_2$—$NH_2$, wherein $X_1$, $X_2$ and $X_3$ are independently selected from the group consisting of halogen atom, halogenated alkyl group, halogenated alkoxy group, halogenated aromatic ring group, —$NO_2$, —$OR^1$ and $SR^1$ (where $R^1$ is a halogenated alkyl or halogenated aromatic ring groups), where $Z_1$ and $Z_2$ are selected from the group consisting of divalent halogenated aliphatic hydrocarbon, divalent halogenated aliphatic cyclic hydrocarbon or divalent halogenated aromatic hydrocarbon and where Y is a halogen atom; said reaction being performed at a temperature in the range of −20 to 50° C., then precipitating the reaction mixture using distilled water or an organic solvent to obtain a polyamideamic acid; and (b) imidizing said polyamideamic acid.

10. The method of claim 9, wherein in the step (a), said bis(3,5,6-trisubstituted-4-halogenformyl-1,2-phthalic imide) derivative is reacted with said diamine compound at 5 to 20° C. for 100 to 230 hours.

11. The method of claim 9, where the step (b) comprises mixing said polyamideamic acid with acetic anhydride and pyridine and then heating the mixture in the range of approximately 60 to 150° C.

12. The method of claim 9, where step (b) comprises adding toluene to the polyamideamic acid and then heating to the boiling point of the toluene.

13. The method of claim 9, where step (b) comprises is imidized the polyamideamic acid by heating by steps in a temperature range of approximately 50 to 400° C.

14. A polymer prepared by the method of claim 9, where said bis(3,5,6-trisubstituted-4-halogenformyl-1,2-phthalic imide) is selected from the group consisting of:

1,3-phenylenebis(3,5,6-trichloro-4-chloroformylphthalic imide), 2,4,5,6-tetrafluorophenylene-1,3-bis(3,5,6-trichloro-4-chloroformylphthalic imide), octafluorobiphenyl-4,4'-bis(3,5,6-trichloro-4-chloroformyl phthalic imide), 1,3-hexachloroisopropylidene-2,2-diphenyl bis(3,5,6-trichloro-4-chloroformylphthalic imide), 1,3-hexachloroisopropylidene-2,2-octafluorobiphenyl-4,4'-bis(3,5,6-trichloro-4-chloroformylphthalic imide), 4,4'-octachlorodiphenyleneether bis(3,5,6-trichloro-4-chloroformylphthalic imide).

* * * * *